(12) United States Patent
Choi

(10) Patent No.: US 10,709,202 B2
(45) Date of Patent: Jul. 14, 2020

(54) METHOD FOR MANUFACTURING SHOE

(71) Applicant: In Kwon Kang, Busan (KR)

(72) Inventor: Hye Kyung Choi, Busan (KR)

(73) Assignee: In Kwon Kang, Busan (KR)

( * ) Notice: Subject to any disclaimer, the term of this patent is extended or adjusted under 35 U.S.C. 154(b) by 214 days.

(21) Appl. No.: 16/060,246

(22) PCT Filed: Dec. 8, 2016

(86) PCT No.: PCT/KR2016/014365
§ 371 (c)(1),
(2) Date: Jun. 7, 2018

(87) PCT Pub. No.: WO2017/099489
PCT Pub. Date: Jun. 15, 2017

(65) Prior Publication Data
US 2018/0368521 A1 Dec. 27, 2018

(30) Foreign Application Priority Data
Dec. 8, 2015 (KR) .................. 10-2015-0174143

(51) Int. Cl.
| A43B 13/32 | (2006.01) |
| A43B 13/04 | (2006.01) |
| A43B 9/00 | (2006.01) |
| B29D 35/06 | (2010.01) |
| B29D 35/08 | (2010.01) |
| A43B 9/16 | (2006.01) |

(52) U.S. Cl.
CPC ............... *A43B 13/32* (2013.01); *A43B 9/00* (2013.01); *A43B 9/16* (2013.01); *A43B 13/04* (2013.01); *B29D 35/06* (2013.01); *B29D 35/065* (2013.01); *B29D 35/08* (2013.01); *B29D 35/085* (2013.01)

(58) Field of Classification Search
CPC .. A43B 13/32; A43B 9/16; A43B 9/00; A43B 9/04; B29D 35/08; B29D 35/06; B29D 35/065; B29D 35/085
USPC ........................................................ 156/242
See application file for complete search history.

(56) References Cited

U.S. PATENT DOCUMENTS

2013/0160937 A1* 6/2013 Park ..................... C09J 5/06
156/245

FOREIGN PATENT DOCUMENTS

| KR | 10-2000-0059180 | 10/2000 |
| KR | 10-2003-0003202 | 1/2003 |
| KR | 10-2004-0013631 | 2/2004 |
| KR | 10-2010-0102029 | 9/2010 |
| KR | 10-2013-0075629 | 7/2013 |

OTHER PUBLICATIONS

Korean Notice of Allowability for Application No. 10-2015-0174143 dated Apr. 12, 2016.
International Search Report for PCT/KR2016/014365 dated Feb. 20, 2017.
Written Opinion for PCT/KR2016/014365 dated Feb. 20, 2017.

* cited by examiner

*Primary Examiner* — Philip C Tucker
*Assistant Examiner* — Vicki Wu
(74) *Attorney, Agent, or Firm* — Nixon Peabody LLP; Jeffrey L. Costellia

(57) ABSTRACT

Provided is a method of manufacturing a shoe by which an outsole, a midsole, and an upper part are integrally manufactured in first-through third-stage molds without liquid primer or adhesive processing.

8 Claims, 6 Drawing Sheets

METHOD FOR MANUFACTURING SHOE

TECHNICAL FIELD

The present disclosure relates to a method for manufacturing a shoe, and more particularly, to a method for manufacturing a shoe by which an outsole, a midsole, and an upper part are integrally manufactured in first-through third-stage molds without liquid primer or adhesive processing.

BACKGROUND ART

A shoe usually includes an upper part protecting the top of a foot and an ankle, a midsole bonded to the bottom of the upper part and made of resin foam material having buffering and elastic properties to disperse and support the weight of a human body when walking, and an outsole bonded to the bottom of the midsole and made of rubber or other material to give a friction force against the ground when walking.

In conventional methods of manufacturing a shoe, an outsole, a midsole, and an upper part are separately produced, then undergo cleaning or pretreatment and bonding sequentially, and are then manually joined together by a worker. Thereafter, they are compressed using a compressor and cooled down, and a complete shoe is obtained after threading and inspection.

Accordingly, at least five skilled workers are required at a minimum of one production line while primer processing and dry, adhesive application, bonding, etc are being performed on each of the outsole, the midsole, and the upper part.

Since the conventional shoe manufacturing methods require drying, compression, cooling, etc. in each of a series of processes such as cleaning, pretreatment, adhesive application, etc. and depend a lot on workers' manual labor, the quality may not be uniform.

In addition, a lot of organic solvent is usually contained in a primer or an adhesive processed during the manufacture of a shoe, and therefore, workers may be exposed to a harmful environment. Moreover, environmental pollution may be caused since harmful solvent is volatilized and released via an application line and a drying process. Furthermore, the burden of personnel expenses causes shoes to be manufactured in developing countries where labor is cheap and environmental regulations are loose.

DESCRIPTION OF EMBODIMENTS

Technical Problem

Provided is a method for manufacturing a shoe by which an outsole, a midsole, and an upper part are integrally manufactured in first-through third-stage molds without liquid primer or adhesive processing.

Solution to Problem

According to an aspect of the present disclosure, a method for manufacturing a shoe includes putting unvulcanized rubber into an outsole frame formed in a first-stage mold; applying predetermined heat and pressure to the unvulcanized rubber in the outsole frame; preparing a first film by applying a pretreatment film to one surface of a release film or paper to a predetermined thickness and positioning the first film such that the pretreatment film borders a top of the first-stage mold and a top of the unvulcanized rubber in the outsole frame; performing vulcanization on the unvulcanized rubber in the outsole frame; preparing an outsole of which a top is processed with the pretreatment film by removing the release film or paper from the first film; preparing a second-stage mold having a midsole frame penetrated vertically and positioning the second-stage mold on the first-stage mold such that the midsole frame is on a top of the outsole frame; positioning a first reactive adhesive film on the second-stage mold; tightly applying the first reactive adhesive film to an inner surface of the midsole frame by heating the first reactive adhesive film and creating a vacuum in the midsole frame; preparing a third-stage mold having a fixed frame penetrated vertically and positioning an upper part inside the fixed frame; positioning a second reactive adhesive film on a bottom of the third-stage mold such that the second reactive adhesive film is positioned on a bottom of the upper part; tightly applying the second reactive adhesive film to the bottom of the upper part by heating the second reactive adhesive film and creating a vacuum between the bottoms of the upper part and the third-stage mold and the second reactive adhesive film; injecting liquid foam into the midsole frame coated with the first reactive adhesive film; putting the third-stage mold on the second-stage mold such that the bottom of the upper part coated with the second reactive adhesive film is positioned on the midsole frame injected with the liquid foam; and forming a midsole between the outsole and the upper part by performing a foam process on the liquid foam.

The applying of the predetermined heat and pressure may include forming the unvulcanized rubber into a shape of the outsole frame by applying a pressure of 10 kgf/cm$^2$ to 15 kgf/cm$^2$ and heat of 130° C. to 170° C. to the unvulcanized rubber for 30 seconds to 60 seconds.

The performing of the vulcanization may include manufacturing a vulcanized outsole and vulcanizing the first film, by applying a pressure of 30 kgf/cm$^2$ to 60 kgf/cm$^2$ and heat of 130° C. to 170° C. to the unvulcanized rubber for seven minutes to ten minutes.

The positioning of the first reactive adhesive film may include preparing a second film by applying the first reactive adhesive film to one surface of a release film or paper to a predetermined thickness; positioning the second film such that the first reactive adhesive film borders a top of the second-stage mold and the midsole frame; and removing the release film or paper from the second film.

The positioning of the second reactive adhesive film may include preparing a third film by applying the second reactive adhesive film to one surface of a release film or paper to a predetermined thickness; positioning the third film such that the second reactive adhesive film borders the bottom of the third-stage mold and the bottom of the upper part; and removing the release film or paper from the third film.

The preparing of the third-stage mold and the positioning of the upper part may include turning the third-stage mold and the upper part upside down such that the bottoms of the third-stage mold and the upper part are positioned at an upper portion. The positioning of the second reactive adhesive film may include preparing the third film by applying the second reactive adhesive film to one surface of a release film or paper to a predetermined thickness and positioning the third film such that the second reactive adhesive film borders the bottom of the third-stage mold and the bottom of the upper part. The putting of the third-stage mold on the second-stage mold may include turning the third-stage mold back over such that the second reactive adhesive film applied to the bottom of the third-stage mold is in contact with the first reactive adhesive film applied to the top of the second-stage mold.

The pretreatment film may be formed by blending a water-dispersible polyurethane adhesive with aqueous natural rubber and may be applied to a release film or paper to form a dry film having a thickness of 20 µm to 60 µm, and a weight ratio of the water-dispersible polyurethane adhesive and the aqueous natural rubber may be 100:30 to 100.

The first reactive adhesive film and the second reactive adhesive film may be formed by applying a mixture of a water-dispersible polyurethane adhesive, a water-dispersible blocked curing agent, and a catalyst to a release film or paper to form a dry film having a thickness of 50 µm to 150 µm, and a weight ratio of the water-dispersible polyurethane adhesive, the water-dispersible blocked curing agent, and the catalyst may be 100:5 to 10:0.5 to 2.

Advantageous Effects of Disclosure

According to embodiments of the present disclosure, an outsole, a midsole, and an upper part are integrally manufactured in first-through third-stage molds without liquid primer or adhesive processing in a method for manufacturing a shoe, so that manufacturing cost may be decreased, processes may be quickly performed, and uniform quality may be achieved.

BEST MODE

A method for manufacturing a shoe includes putting unvulcanized rubber into an outsole frame formed in a first-stage mold; applying predetermined heat and pressure to the unvulcanized rubber in the outsole frame; preparing a first film by applying a pretreatment film to one surface of a release film or paper to a predetermined thickness and positioning the first film such that the pretreatment film borders a top of the first-stage mold and a top of the unvulcanized rubber in the outsole frame; performing vulcanization on the unvulcanized rubber in the outsole frame; preparing an outsole of which a top is processed with the pretreatment film by removing the release film or paper from the first film; preparing a second-stage mold having a midsole frame penetrated vertically and positioning the second-stage mold on the first-stage mold such that the midsole frame is on a top of the outsole frame; positioning a first reactive adhesive film on the second-stage mold; tightly applying the first reactive adhesive film to an inner surface of the midsole frame by heating the first reactive adhesive film and creating a vacuum in the midsole frame; preparing a third-stage mold having a fixed frame penetrated vertically and positioning an upper part inside the fixed frame; positioning a second reactive adhesive film on a bottom of the third-stage mold such that the second reactive adhesive film is positioned on a bottom of the upper part; tightly applying the second reactive adhesive film to the bottom of the upper part by heating the second reactive adhesive film and creating a vacuum between the bottoms of the upper part and the third-stage mold and the second reactive adhesive film; injecting liquid foam into the midsole frame coated with the first reactive adhesive film; putting the third-stage mold on the second-stage mold such that the bottom of the upper part coated with the second reactive adhesive film is positioned on the midsole frame injected with the liquid foam; and forming a midsole between the outsole and the upper part by performing a foam process on the liquid foam.

MODE OF DISCLOSURE

Embodiments of the present disclosure will be described in detail with reference to the accompanying drawings.

Figure 1:
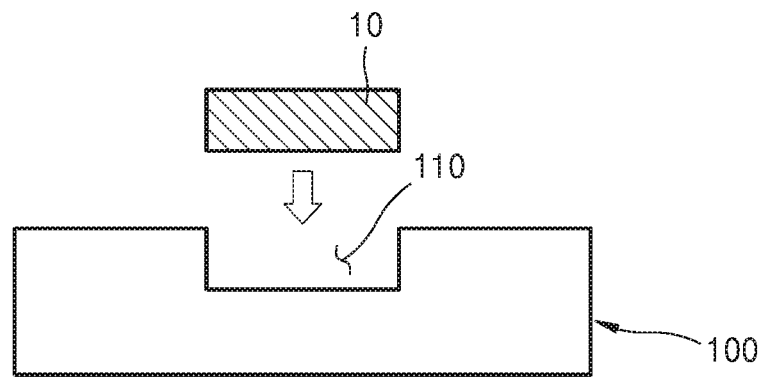
FIG. 1 is a diagram of a process of putting unvulcanized rubber into a first-stage mold.

As shown in FIG. 1, a first-stage mold 100 having an outsole frame 110 is provided, and unvulcanized rubber 10 is put into the outsole frame 110. The outsole frame 110 is formed in the first-stage mold 100 according to the shape of an outsole, and the unvulcanized rubber 10, which has not undergone vulcanization, is put into the outsole frame 110.

Figure 2:
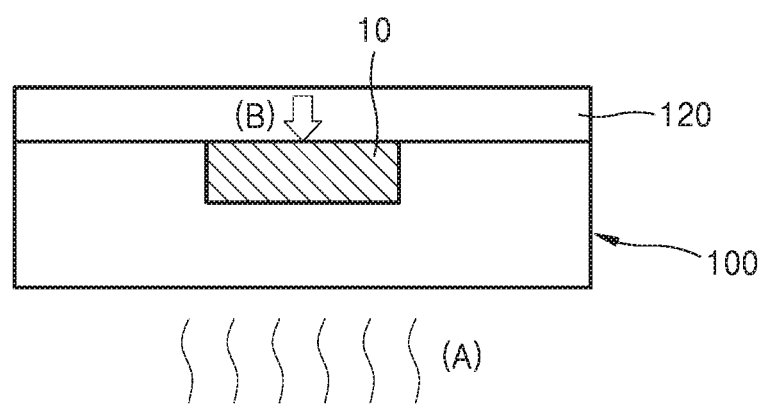
FIG. 2 is a diagram of a process of positioning a cover on the first-stage mold and applying heat and pressure to the unvulcanized rubber.

Subsequently, as shown in parts (A) and (B) in FIG. 2, predetermined heat and pressure is applied to the unvulcanized rubber 10 in the outsole frame 110. At this time, after a cover 120 is positioned on the first-stage mold 100, a pressure of 10 kgf/cm$^2$ to 15 kgf/cm$^2$ and heat of about 130° C. to about 170° C. are applied to the unvulcanized rubber 10 for 30 seconds to 60 seconds, so that the unvulcanized rubber 10 is formed into the shape of the outsole frame 110.

Figure 3:
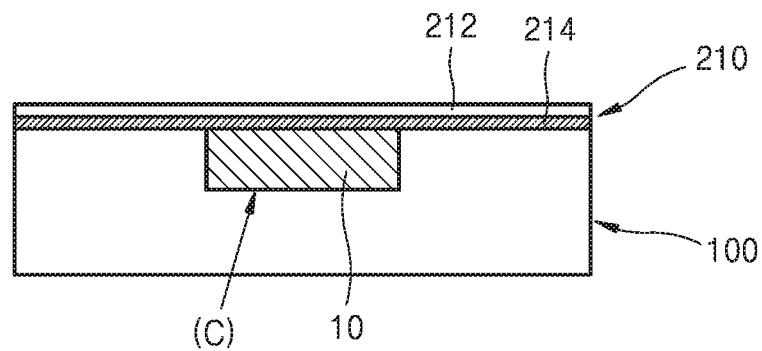
FIG. 3 is a diagram showing vulcanization performed after removing the cover and placing a first film on the first-stage mold.

Subsequently, as shown in FIG. 3, after the cover 120 is removed, a first film 210, in which a pretreatment film 214 is formed to a predetermined thickness by applying a pretreatment agent to one surface of a first release film 212, is provided. The first film 210 is positioned on the top of the first-stage mold 100. At this time, the first film 210 is positioned such that the pretreatment film 214 borders the top of the first-stage mold 100 and the top of the unvulcanized rubber 10. The first release film 212 may be formed of predetermined first release paper.

Meanwhile, in manufacturing the first film 210, a pretreatment agent is formed by blending a water-dispersible polyurethane adhesive with aqueous natural rubber, and the pretreatment agent is applied to the first release film 212 or first release paper using roll coating to form the pretreatment film 214 including a dry film having a thickness of 20 μm to 60 μm on the first release film 212 or the first release paper. At this time, the weight ratio of the water-dispersible polyurethane adhesive and the aqueous natural rubber may be 100:30 to 100.

Figure 4:
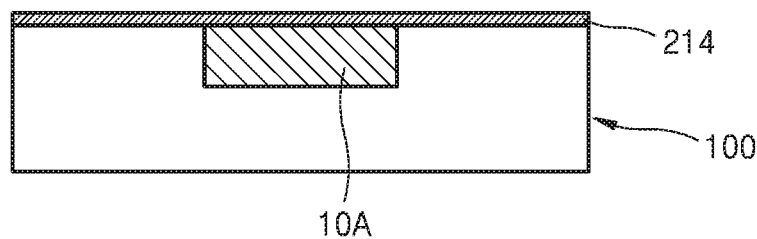
FIG. 4 is a diagram showing the removal of a first release film or release paper from the first film.

Subsequently, as shown in part (C) in FIG. 3, vulcanization is performed on the unvulcanized rubber 10 in the outsole frame 110. Thereafter, as shown in FIG. 4, the first release film 212 or the first release paper is removed from the first film 210 to provide outsole rubber 10A of which the top is processed with the pretreatment film 214.

At this time, the vulcanization may be performed by applying a pressure of 30 kgf/cm$^2$ to 60 kgf/cm$^2$ and heat of 130° C. to 170° C. to the unvulcanized rubber 10 for seven minutes to ten minutes, thereby forming a vulcanized outsole. The first film 210 is also vulcanized.

Since pretreatment is performed on the top of the outsole rubber 10A as described above, an outsole is easily bonded to a midsole which will be described below. In other words, polyurethane, which is usually used in manufacturing a shoe, does not adhere to an outsole since polyurethane has a different chemical structure than the outsole. However, when the top of the outsole rubber 10A is pretreated with a pretreatment agent in which natural rubber highly compatible with the outsole rubber 10A is blended with a polyurethane adhesive, according to one or more embodiments, bonding between an outsole and a midsole may be easily carried out.

In addition, instead of being provided on the unvulcanized rubber 10 via simple application, the pretreatment agent is positioned on the unvulcanized rubber 10 as a film applied to the first release film 212 or the first release paper and then undergoes vulcanization. Thereafter, the first release film 212 or the first release paper is removed. Accordingly, pretreatment may be easily performed without requiring complex processes including manual labor.

Figure 5:
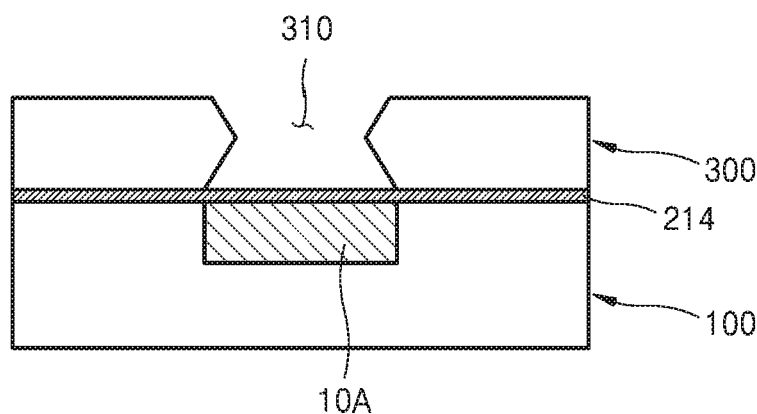
FIG. 5 is a diagram showing the positioning of a second-stage mold on the first-stage mold.

Next, as shown in FIG. 5, a second-stage mold 300 having a midsole frame 310 penetrated vertically is prepared and positioned on the first-stage mold 100. At this time, the midsole frame 310 formed in the second-stage mold 300 is positioned on the outsole frame 110.

Figure 6:
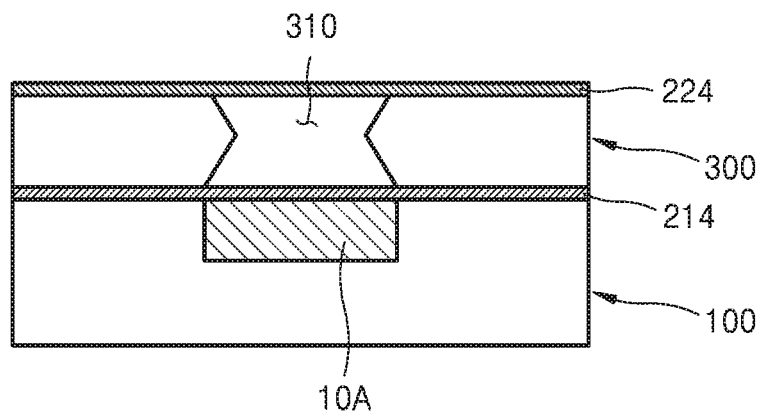
FIG. 6 is a diagram showing the positioning of a first reactive adhesive film on the second-stage mold.

Subsequently, as shown in FIG. 6, a first reactive adhesive film 224 is positioned on the second-stage mold 300. At this time, the first reactive adhesive film 224 may be formed by applying a reactive adhesive formed by blending a water-dispersible polyurethane adhesive, a water-dispersible blocked curing agent, and a catalyst to a second release film 222 or release paper such that the reactive adhesive forms a dry film having a thickness of 50 μm to 150 μm. At this time, the weight ratio of the water-dispersible polyurethane adhesive, the water-dispersible blocked curing agent, and the catalyst is 100:5 to 10:0.5 to 2.

Figure 7:
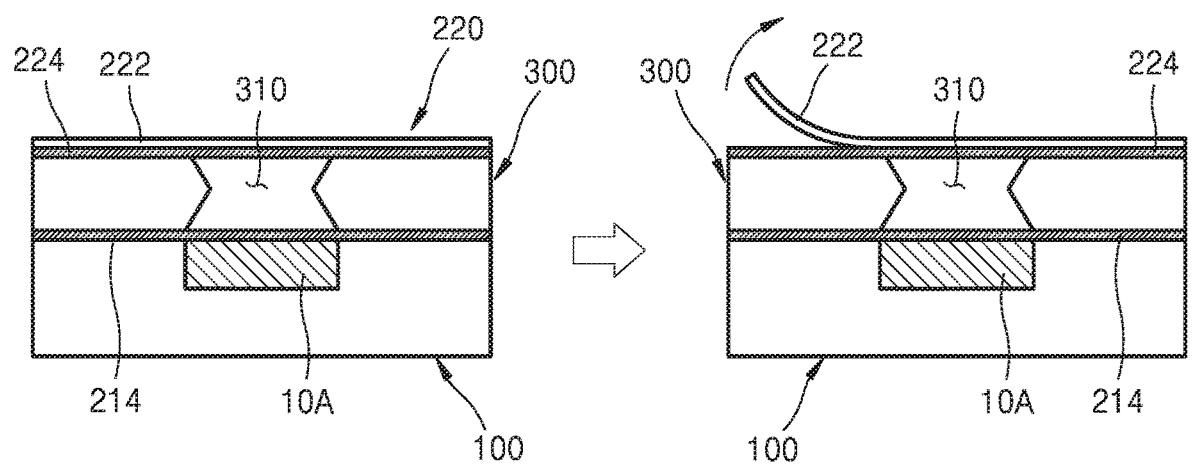
FIG. 7 is a diagram showing the positioning of a second film on the second-stage mold and the removal of a second release film or release paper.

Here, the positioning of the first reactive adhesive film 224 on the second-stage mold 300 may be performed as shown in FIG. 7.

Firstly, a second film 220 may be prepared by applying a first reactive adhesive to one surface of the second release film 222 or the release paper to a predetermined thickness. In other words, the second film 220 has a structure in which the first reactive adhesive film 224 is formed on one surface of the second release film 222 or the release paper. Next, the second film 220 is positioned on the second-stage mold 300 such that the first reactive adhesive film 224 borders the top of the second-stage mold 300 and the top of the midsole frame 310. Next, the second release film 222 or the release paper is removed from the second film 220. As a result, the first reactive adhesive film 224 may be positioned on the second-stage mold 300.

Figure 8:
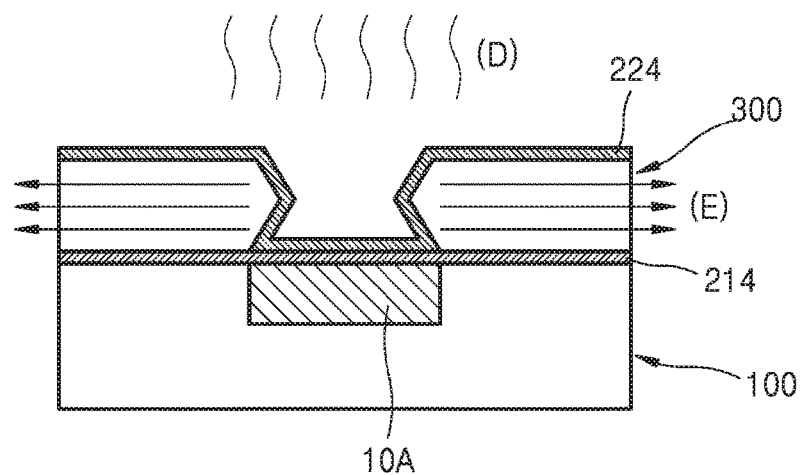
FIG. 8 is a diagram showing the vacuum-adsorption of the first reactive adhesive film to the second-stage mold.

Subsequently, the first reactive adhesive film 224 positioned on the second-stage mold 300 is heated, as shown in part (D) in FIG. 8, and simultaneously, as shown in part (E) (도면에 표시 누락) in FIG. 8, a vacuum is created in the midsole frame 310, so that the first reactive adhesive film 224 is tightly applied to the inner surface of the midsole frame 310. In other words, the first reactive adhesive film 224 may cover and be adsorbed to the top of the second-stage mold 300, the inner surface of the midsole frame 310 formed in the second-stage mold 300, and the top of the outsole rubber 10A exposed through the midsole frame 310 by heating the first reactive adhesive film 224 and vacuumizing the space between the first reactive adhesive film 224 and the second-stage mold 300. According to an embodiment, an outlet may be provided in the second-stage mold 300 and connected to a vacuum pump to create the vacuum by discharging air from the space between the first reactive adhesive film 224 and the second-stage mold 300. Detailed methods and means are not limited here.

Figure 9:
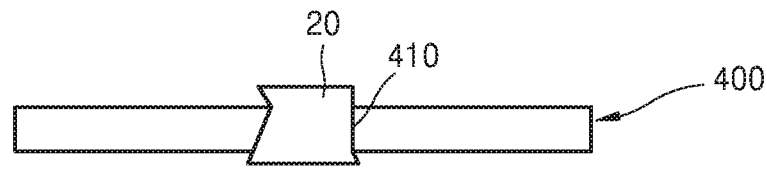
FIG. 9 is a diagram showing the positioning of an upper part at a third-stage mold.

Subsequently, as shown in FIG. 9, a third-stage mold 400 having a fixed frame 410 penetrated vertically is prepared, and an upper part 20 is positioned in the fixed frame 410.

Figure 10:
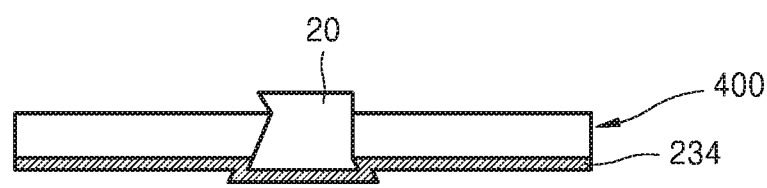
FIG. 10 is a diagram showing the application of a second reactive adhesive film to the bottom of the third-stage mold.

Next, as shown in FIG. 10, a second reactive adhesive film 234 is positioned on the bottom of the third-stage mold 400. Next, the second reactive adhesive film 234 is heated and a vacuum is created between the bottoms of the upper part 20 and the third-stage mold 400 and the second reactive adhesive film 234 so that the second reactive adhesive film 234 is adsorbed to the bottom of the upper part 20.

Here, positioning the second reactive adhesive film 234 on the bottom of the third-stage mold 400 may be performed in a similar manner to positioning the first reactive adhesive film 224 on the top of the second-stage mold 300.

Figure 11:
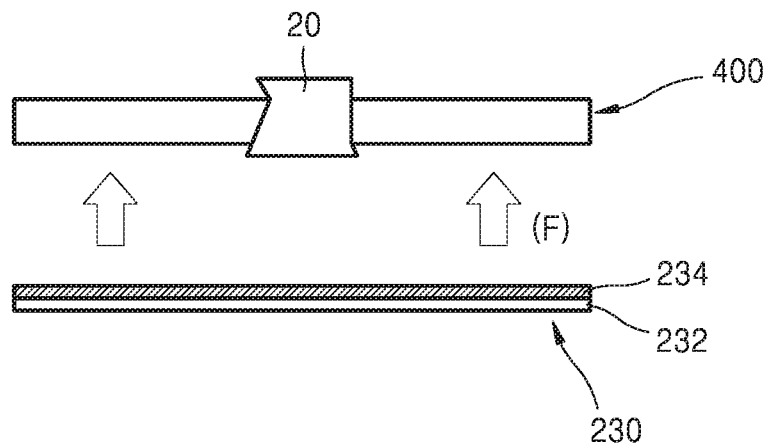
FIG. 11 is a diagram showing the positioning of a third film on the bottom of the third-stage mold.

In other words, as shown in FIG. 11, a third film 230, in which the second reactive adhesive film 234 is formed on one surface of a third release film 232 or release paper to a predetermined thickness, is prepared. As shown in part (F) in FIG. 11, the third film 230 is positioned such that the second reactive adhesive film 234 borders the bottoms of the third-stage mold 400 and the upper part 20.

Figure 12:
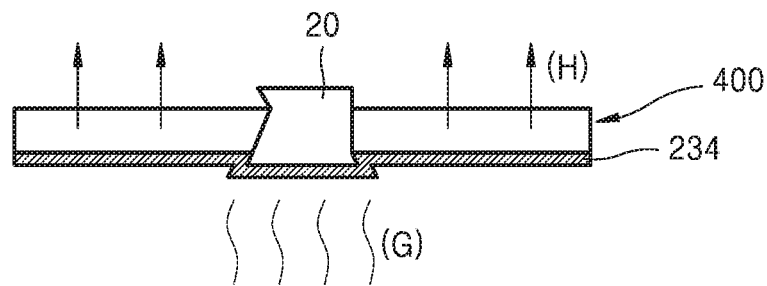
FIG. 12 is a diagram showing the vacuum-adsorption of the second reactive adhesive film to the bottom of the third-stage mold after removing a third release film or release paper from the third film.

Subsequently, as shown in FIG. 12, the third release film 232 or the release paper is removed from the third film 230. Thereafter, as shown in parts (G) and (H) in FIG. 12, the second reactive adhesive film 234 is heated and vacuum-adsorbed. As a result, the second reactive adhesive film 234 may be adsorbed to the bottom of the third-stage mold 400 and the bottom of the upper part 20. At this time, adsorption may be performed by rapidly increasing the surface temperature of the second reactive adhesive film 234 to about 80° C. to about 130° C. using a near-infrared (NIR) heating device and letting the second reactive adhesive film 234 be vacuum-adsorbed to the bottom of the third-stage mold 400 through vacuum microtubes.

At this time, the second reactive adhesive film 234 may have the same structure as the first reactive adhesive film 224. In other words, the second reactive adhesive film 234 may be formed by applying a reactive adhesive formed by blending a water-dispersible polyurethane adhesive, a water-dispersible blocked curing agent, and a catalyst to the third release film 232 or the release paper such that the reactive adhesive forms a dry film having a thickness of 50 µm to 150 µm. At this time, the weight ratio of the water-dispersible polyurethane adhesive, the water-dispersible blocked curing agent, and the catalyst is 100:5 to 10:0.5 to 2.

Henkel Technologies Aqueous W-01, Hanyoung Industry KW-100A, or Hwaseng T&C AW-3080, which is usually used for shoes, is suitable as the water-dispersible polyurethane adhesive.

Baxenden Trixene BI 201 or Trixene BI 220 may be used as the water-dispersible blocked curing agent. A polyfunctional amine is suitable as the catalyst. An aromatic group or an aliphatic group alone or a mixture thereof is used as the polyfunctional amine of which the kinds are shown below. In particular, an aliphatic amine may selectively include ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'-diaminodicyclohexyl methane, 4,4'-diaminodicyclohexyl methane and 3,3'-dialkyl-4,4'-diaminodicyclohexyl methane (e.g., 3,3'-dimethyl-4,4'-diaminodicyclohexyl methane; ancamine and 3,3'-diethyl-4,4'-diaminodicyclohexyl methane), 2,4- and/or 2,6-diaminotoluene and 2,4'- and/or 4,4'-diaminodiphenyl methane, or a mixture thereof, but the present disclosure is not limited thereto. Jeffamine products of Huntsman may also be used.

Figure 13:
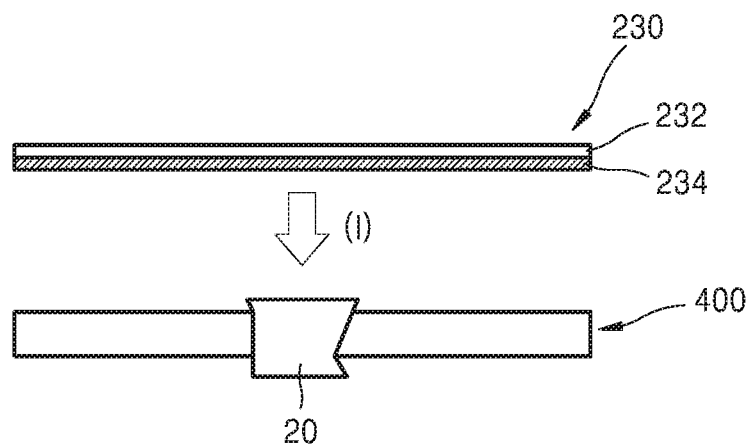
FIG. 13 is a diagram showing the positioning of the third film on the bottom of the third-stage mold in a state where the third-stage mold is turned upside down.
Figure 14:
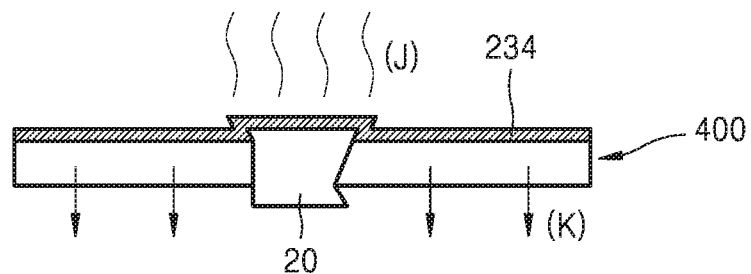
FIG. 14 is a diagram showing the vacuum-adsorption of the second reactive adhesive film to the bottom of the third-stage mold after removing the third release film or release paper from the third film in FIG. 13.

In another embodiment, positioning the second reactive adhesive film 234 on the bottom of the third-stage mold 400 may be performed as shown in FIGS. 13 and 14.

In detail, as shown in FIG. 13, the third-stage mold 400 and the upper part 20 are turned upside down such that the bottoms of the third-stage mold 400 and the upper part 20 are positioned at an upper portion, and the third film 230 is positioned on the bottoms of the third-stage mold 400 and the upper part 20. At this time, since the third-stage mold 400 is turned upside down and the bottoms of the third-stage mold 400 and the upper part 20 are positioned at the upper portion, the third film 230 may be laid down from above, as shown in part (I) in FIG. 13. The third film 230 is positioned such that the second reactive adhesive film 234 borders the bottoms of the third-stage mold 400 and the upper part 20. Subsequently, as shown in FIG. 14, the third release film 232 or the release paper is removed, and the second reactive adhesive film 234 is adsorbed to the bottoms of the third-stage mold 400 and the upper part 20 through heating and vacuum-adsorption, as shown in parts (J) and (K). Since the second reactive adhesive film 234 is adsorbed after being laid down on the bottom of the third-stage mold 400 from above, the process may be facilitated.

Figure 15:
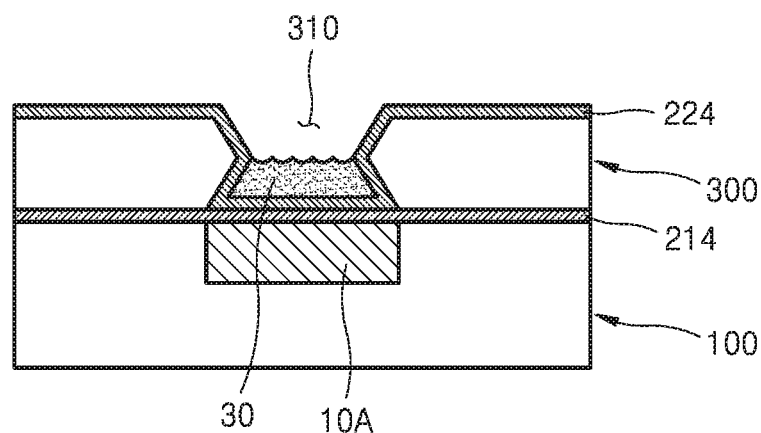
FIG. 15 is a diagram showing the injection of liquid foam into a midsole frame.

Next, as shown in FIG. 15, liquid foam 30 is injected into the midsole frame 310 coated with the first reactive adhesive film 224. The liquid foam 30 may be liquid polyurethane (PU) foam.

Figure 16:
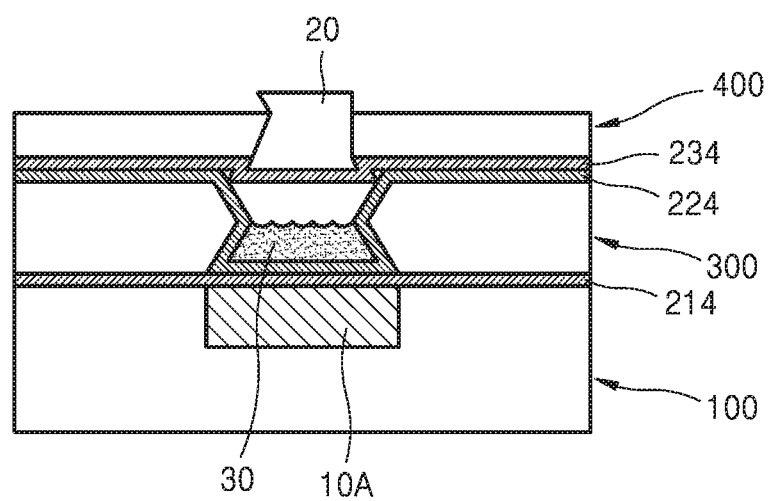
FIG. 16 is a diagram of a process of joining the third-stage mold and the second-stage mold and performing a foam process on the liquid foam.

Subsequently, as shown in FIG. 16, the third-stage mold 400 is put on the second-stage mold 300 such that the bottom of the upper part 20 is positioned on the midsole frame 310 into which the liquid foam 30 has been injected, the bottom of the upper part 20 having been coated with the second reactive adhesive film 234. Accordingly, a midsole is positioned between the upper part 20 and an outsole. The midsole is in a state of the liquid foam 30.

When the third-stage mold 400 has been turned upside down according to another embodiment, the third-stage mold 400 is turned back such that the bottom of the third-stage mold 400 is positioned on the top of the second-stage mold 300.

Subsequently, a foam process is performed on the liquid foam 30 to form the midsole between the outsole rubber 10A and the upper part 20. As a result, a shoe in which the outsole, the midsole, and the upper part 20 are joined together is completed.

In the description above, the first film 210 is positioned on the top of the first-stage mold 100, the first reactive adhesive film 224 is positioned on the top of the second-stage mold 300, and the second reactive adhesive film 234 is positioned on the bottom of the third-stage mold 400, but the present disclosure is not limited thereto. Apart from positioning an adhesive and a pretreatment agent as a film, the adhesive and the pretreatment agent may be applied using spray coating. In other words, the application of the adhesive and the pretreatment agent may be performed in various manners.

In a method for manufacturing a shoe according to one or more embodiments, an outsole, a midsole, and an upper part are integrally manufactured in first-through third-stage molds without liquid primer or adhesive processing, so that manufacturing cost may be decreased, processes may be quickly performed, and uniform quality may be achieved.

In other words, shoe manufacturing is performed using a three-stage mold; an outsole, a midsole, and an upper part are joined together using a single foam process, i.e., foaming of the midsole; and application of an adhesive is performed using a film-type adhesive instead of a liquid-type adhesive. Accordingly, drying, compressing, and cooling processes required during cleaning, pretreatment, and adhesive application performed in conventional shoe manufacturing methods may be omitted or drastically reduced. In addition, processes depending on workers' manual labor are decreased to only placing a mold to a predetermined position, so that uniform quality may be achieved. Besides, the number of workers is reduced by about 25%, so that shoe manufacturing may be performed in a small space.

Moreover, since use of primer and adhesive is reduced, environments around a work place are improved and discharge of $CO_2$ is reduced, so that environment-friendly manufacturing may be accomplished.

While this present disclosure has been particularly shown and described with reference to preferred embodiments thereof, it should not be construed as being limited to the particular embodiments described above. It will be understood by those skilled in the art that various modifications may be made therein without departing from the gist of the present disclosure as defined by the appended claims. The various modifications should not be understood independently from the spirit or perspective of the present disclosure.

The invention claimed is:

1. A method for manufacturing a shoe, the method comprising:
   putting unvulcanized rubber into an outsole frame formed in a first-stage mold;
   applying predetermined heat and pressure to the unvulcanized rubber in the outsole frame;
   preparing a first film by applying a pretreatment film to one surface of a first release film or first paper to a predetermined thickness and positioning the first film such that the pretreatment film borders a top of the first-stage mold and a top of the unvulcanized rubber in the outsole frame;

performing vulcanization on the unvulcanized rubber in the outsole frame;

preparing an outsole of which a top is processed with the pretreatment film by removing the first release film or first paper from the first film;

preparing a second-stage mold having a midsole frame penetrated vertically and positioning the second-stage mold on the first-stage mold such that the midsole frame is on a top of the outsole frame;

positioning a first reactive adhesive film on top of the second-stage mold;

tightly applying the first reactive adhesive film to an inner surface of the midsole frame by heating the first reactive adhesive film and creating a vacuum in the midsole frame;

preparing a third-stage mold having a fixed frame penetrated vertically and positioning an upper part inside the fixed frame;

positioning a second reactive adhesive film on a bottom of the third-stage mold such that the second reactive adhesive film is positioned on a bottom of the upper part;

tightly applying the second reactive adhesive film to the bottom of the upper part by heating the second reactive adhesive film and creating a vacuum between the bottoms of the upper part and the third-stage mold and the second reactive adhesive film;

injecting liquid foam into the midsole frame coated with the first reactive adhesive film;

putting the third-stage mold on the second-stage mold such that the bottom of the upper part coated with the second reactive adhesive film is positioned on the midsole frame injected with the liquid foam; and forming a midsole between the outsole and the upper part by performing a foam process on the liquid foam.

2. The method of claim 1, wherein the applying of the predetermined heat and pressure comprises forming the unvulcanized rubber into a shape of the outsole frame by applying a pressure of 10 kgf/cm$^2$ to 15 kgf/cm$^2$ and heat of 130° C. to 170° C. to the unvulcanized rubber for 30 seconds to 60 seconds.

3. The method of claim 1, wherein the performing of the vulcanization comprises manufacturing a vulcanized outsole and vulcanizing the first film, by applying a pressure of 30 kgf/cm$^2$ to 60 kgf/cm$^2$ and heat of 130° C. to 170° C. to the unvulcanized rubber for seven minutes to ten minutes.

4. The method of claim 1, wherein the positioning of the first reactive adhesive film comprises:

preparing a second film by applying the first reactive adhesive film to one surface of a release second film or second paper to a predetermined thickness;

positioning the second film such that the first reactive adhesive film borders a top of the second-stage mold and the midsole frame; and removing the second release film or second paper from the second film.

5. The method of claim 1, wherein the positioning of the second reactive adhesive film comprises:

preparing a third film by applying the second reactive adhesive film to one surface of a third release film or third paper to a predetermined thickness;

positioning the third film such that the second reactive adhesive film borders the bottom of the third-stage mold and the bottom of the upper part; and removing the third release film or third paper from the third film.

6. The method of claim 1, wherein the preparing of the third-stage mold and the positioning of the upper part comprises turning the third-stage mold and the upper part upside down such that the bottoms of the third-stage mold and the upper part are positioned at an upper portion, the positioning of the second reactive adhesive film comprises:

preparing a third film by applying the second reactive adhesive film to one surface of a third release film or third paper to a predetermined thickness; and positioning the third film such that the second reactive adhesive film borders the bottom of the third-stage mold and the bottom of the upper part, and the putting of the third-stage mold on the second-stage mold comprises turning the third-stage mold back over such that the second reactive adhesive film applied to the bottom of the third-stage mold is in contact with the first reactive adhesive film applied to the top of the second-stage mold.

7. The method of claim 1, wherein the pretreatment film is formed by forming a dry film having a thickness of 20 μm to 60 μm by applying a pretreatment agent to the first release film or first paper using roll coating, the pretreatment agent being formed by blending a water-dispersible polyurethane adhesive with aqueous natural rubber, and a weight ratio of the water-dispersible polyurethane adhesive and the aqueous natural rubber is 100:30 to 100.

8. The method of claim 1, wherein the first reactive adhesive film is formed by applying a mixture of a water-dispersible polyurethane adhesive, a water-dispersible blocked curing agent, and a catalyst to a second release film or second paper to form a dry film having a thickness of 50 μm to 150 μm and the second reactive adhesive is formed by applying a mixture of a water-dispersible polyurethane adhesive, a water-dispersible blocked curing agent, and a catalyst to a third release film or third paper to form a dry film having a thickness of 50 μm to 150 μm, and a weight ratio of the water-dispersible polyurethane adhesive, the water-dispersible blocked curing agent, and the catalyst is 100:5 to 10:0.5 to 2.

* * * * *